(12) United States Patent
Vitaldevara et al.

(10) Patent No.: US 9,058,592 B2
(45) Date of Patent: Jun. 16, 2015

(54) REPORTING COMPROMISED EMAIL ACCOUNTS

(75) Inventors: Krish Vitaldevara, Fremont, CA (US); Jason Walter, San Jose, CA (US); Eliot Gillum, Mountain View, CA (US); Hersh Dangayach, White Plains, NY (US); Samuel J. Albert, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 475 days.

(21) Appl. No.: 13/095,881

(22) Filed: Apr. 28, 2011

(65) Prior Publication Data
US 2012/0278887 A1 Nov. 1, 2012

(51) Int. Cl.
H04L 29/06 (2006.01)
G06Q 10/10 (2012.01)

(52) U.S. Cl.
CPC .......... *G06Q 10/107* (2013.01); *H04L 63/1441* (2013.01)

(58) Field of Classification Search
None
See application file for complete search history.

(56) References Cited

U.S. PATENT DOCUMENTS

| 7,571,220 B1* | 8/2009 | Ng ............................. 709/219 |
| 7,739,169 B2 | 6/2010 | Hammad |
| 2005/0076084 A1* | 4/2005 | Loughmiller et al. ........ 709/206 |
| 2005/0216955 A1 | 9/2005 | Wilkins et al. |
| 2006/0168024 A1* | 7/2006 | Mehr et al. ................... 709/206 |
| 2007/0086592 A1* | 4/2007 | Ellison et al. ................. 380/282 |
| 2007/0192867 A1* | 8/2007 | Miliefsky ........................ 726/25 |
| 2008/0283593 A1 | 11/2008 | He et al. |
| 2009/0133017 A1* | 5/2009 | Boogert et al. .................. 718/1 |
| 2010/0115040 A1* | 5/2010 | Sargent et al. ............... 709/206 |
| 2010/0153394 A1* | 6/2010 | Wood ............................ 707/737 |
| 2011/0016527 A1* | 1/2011 | Yanovsky et al. ............... 726/23 |
| 2012/0066498 A1* | 3/2012 | Engert .......................... 713/170 |

OTHER PUBLICATIONS

Improving E-mail Deliverability into Windows Live Hotmail, Retrieved at <<http://download.microsoft.com/download/e/3/3/e3397e7c-17a6-497d-9693-78f80be272fb/enhance_deliver.pdf>>, Apr. 28, 2007, pp. 26.
"Examples of phishing emails that appear to come from MIT email or webmail team", Retrieved at <<http://kb.mit.edu/confluence/display/istcontrib/Examples+of+phishing+emails+that+appear+to+come+from+MIT+email+or+webmail+team>>, Retrieved Date: Feb. 23, 2011, p. 1.

(Continued)

*Primary Examiner* — David Pearson
(74) *Attorney, Agent, or Firm* — Tom Wong; Aaron Hoff; Micky Minhas

(57) ABSTRACT

The claimed subject matter provides a method for detecting compromised accounts. The method includes receiving a communication from a sender's account to a recipient. The sender's account is associated with a sender. The method also includes presenting a compromised account reporting interface to the recipient based on specific conditions. Further, the method includes receiving a selection by the recipient indicating the sender's account is compromised. The method also includes determining that the sender's account is compromised based on the selection. Additionally, the method includes generating, in response to a selection by the recipient, a report indicating that the account is compromised.

19 Claims, 6 Drawing Sheets

(56) References Cited

OTHER PUBLICATIONS

Tzink, "My Hotmail account has been compromised", Retrieved at<<http://blogs.msdn.com/b/tzink/archive/2010/09/14/my-hotmail-account-has-been-compromised.aspx>>,Sep. 14, 2010, pp. 3.

Peterson, Chris, "Log Management and SIEM: The Network's Trusty Watchdogs", Retrieved at<< http://www.technewsworld.com/rsstory/71160.html >>, Nov. 3, 2010, pp. 4.

* cited by examiner

300

REPORTING COMPROMISED EMAIL ACCOUNTS

BACKGROUND

Malicious actors may endeavor to obtain access to user email accounts for the purpose of sending malicious emails such as spam or phishing emails. Email accounts that are compromised in this manner are frequently used to send spam and phishing emails as though the emails were actually sent from the user of the compromised account. Malicious emails may be sent to people who are known to the true owner of the compromised account (for example, people in the user's contact list), as well as random users. Because of the significant problems that spam, phishing and other malicious emails cause for users of the web, approaches have been developed to detect compromised accounts. Early detection may be useful for a real user to readily re-gain control of compromised email accounts. The security implications of compromised accounts extend beyond emails to other forms of messaging, such as shared files (for example, photos), secure network activity and the like.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The claimed subject matter provides a method for detecting compromised accounts, such as used for email, text messaging, and other network communications. A service provider for a recipient receives a communication from a sender to that recipient. The communication is shown to the recipient, typically after a login process. If the communication indicates that the sender's account has been compromised, and the recipient has an established communication relationship with the sender, e.g., an associate on a contact list, the recipient may flag the communication. Flagging the communication may indicate that the account used to send the communication is compromised. The service provider may determine that the account is compromised based on the flagging, and provide a notification to the service provider for the sender.

Additionally, the claimed subject matter provides a system for detecting compromised accounts. The system may include a processing unit and a system memory. The system memory may include code configured to direct the processing unit to detect compromised accounts. A communication from a sender's account to a recipient may be received. The sender's account may be associated with a sender. A reporting interface may be presented to the recipient based on specific conditions relating to the sender and/or the communication. A selection by the recipient indicating that the sender's account is compromised may be received. It may be determined, based on the selection, that the sender's account is compromised. Based on the determination, a report may be generated indicating that the account is compromised.

Further, the claimed subject matter provides one or more computer-readable storage media. The computer-readable storage media may include code configured to direct a processing unit to detect compromised accounts. A communication from a sender's account to a recipient may be received. The sender's account may be associated with a sender. A compromised account reporting interface may be presented to the recipient based on specific conditions. A selection by the recipient indicating that the sender's account is compromised may be received. It may be determined that the sender's account is compromised based on the selection by the recipient and a behavior of the sender. Based on the determination, a report may be generated indicating that the account is compromised. The report may be based on the communication.

DETAILED DESCRIPTION

Figure 1A:
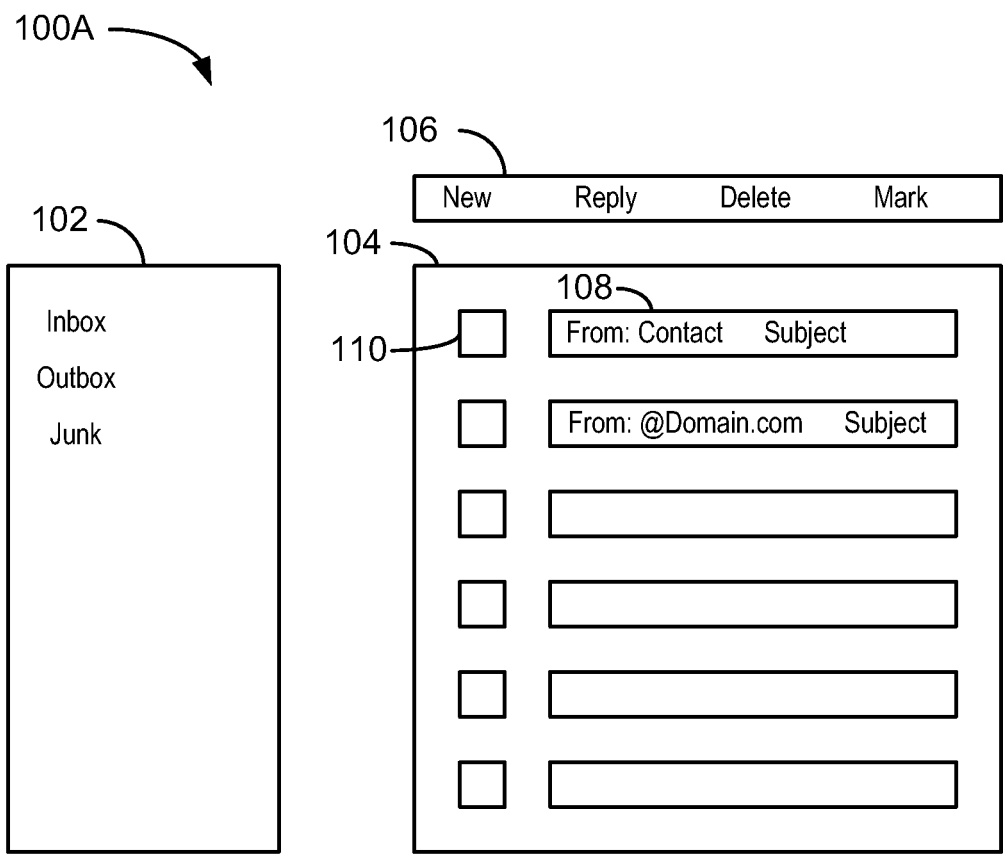
FIGS. 1A-1D are block diagrams of interfaces in accordance with the claimed subject matter.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, the terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware.

By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any non-transitory computer-readable device, or media.

Non-transitory computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not necessarily storage media) may additionally include communication media such as transmission media for wireless signals and the like.

Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Typically, complex algorithms are used to detect compromised accounts. For example, these algorithms may analyze the countries from which a user usually logs in. In some cases, spammers or other malicious actors may login the same account from multiple locations around the world in the span of a few minutes. This may be an indication that a computer, and not the true user, is using the account.

Algorithms may also look for changes in behavior in regard to how the account is used. For example, an email account may be normally used to send 3-4 emails a day, usually without attachments. The account may suddenly start sending thousands of emails a day with large attachments. Detection algorithms may look for such instances of sudden behavior changes. Other approaches include grading accounts in terms of good or bad reputations. In some cases, good reputations may be established by providing passwords. Reputations may be downgraded or improved based on other's feedback regarding communications with a particular account.

It may be additionally useful to have the recipient grade received communications to make the correlation between the communication and suspicious activity associated with the sending account. According to the subject innovation, established communication relationships may be used to identify compromised accounts. For example, a user may submit a report stating that a sender's email account has been compromised. A compromised account reporting interface may be provided for this purpose, including an "account compromised" button, a menu item, check box, or some other user interface element. The report may be generated automatically, without further input from the user. The report may be based on the message that user is currently reading. Although email is used as an example herein, an embodiment may detect other types of compromised accounts for other forms of communication, such as instant messaging, SMS and other text messaging, a telephone communications, images such as shared photos, videos, blog postings, comments on blog postings, updates to online profiles, etc.

For example, Sam may receive a new email from his friend, Andy. In the email, Andy may ask Sam to wire funds to a location in Canada. Sam knows Andy would not travel to Canada without him, so he suspects that Andy's account has been compromised.

Sam may take one, or some combination of the following actions: delete the message, reply to let Andy know his account is compromised, label the message as a 'phishing scam,' or junk the message. It may be desirable to notify the email service provider that Andy's account is compromised. This may enable Andy to regain control of his account.

Having users flag accounts suspected as compromised may be an independent consideration used by detection algorithms to identify compromised accounts. Alternatively, the flagging may be one of several considerations used. For example, the previous communication history between the sender and the recipient may also be considered in identifying an account as compromised. In one embodiment, a feed, such as an RSS feed, may be established to notify service providers about compromised accounts. This may enable these service providers to take remedial measures with regard to the compromised accounts.

FIG. 1A is a block diagram of a compromised account reporting interface 100A in accordance with the claimed subject matter. The compromised account reporting interface 100A may include a folder list 102, a message list 104, and a toolbar 106. Based on a selection from the folder list 102, the message list 104 may be populated with message headers 108. Each of the messages headers 108 may have a checkbox associated for selectively applying actions from the toolbar 106.

The compromised account reporting interface 100A may be displayed in response to a user logging in to an email service. The user may select a message for viewing. The message selected may be from one of the user's associates, e.g., a contact. A spam recipient may have an advantage in identifying email sent from a compromised source. In one embodiment, a user may receive an email that appears to be from a friend. In response to a user selection, the message may be viewed in a message viewer, represented in interface 100B.

Figure 1B:
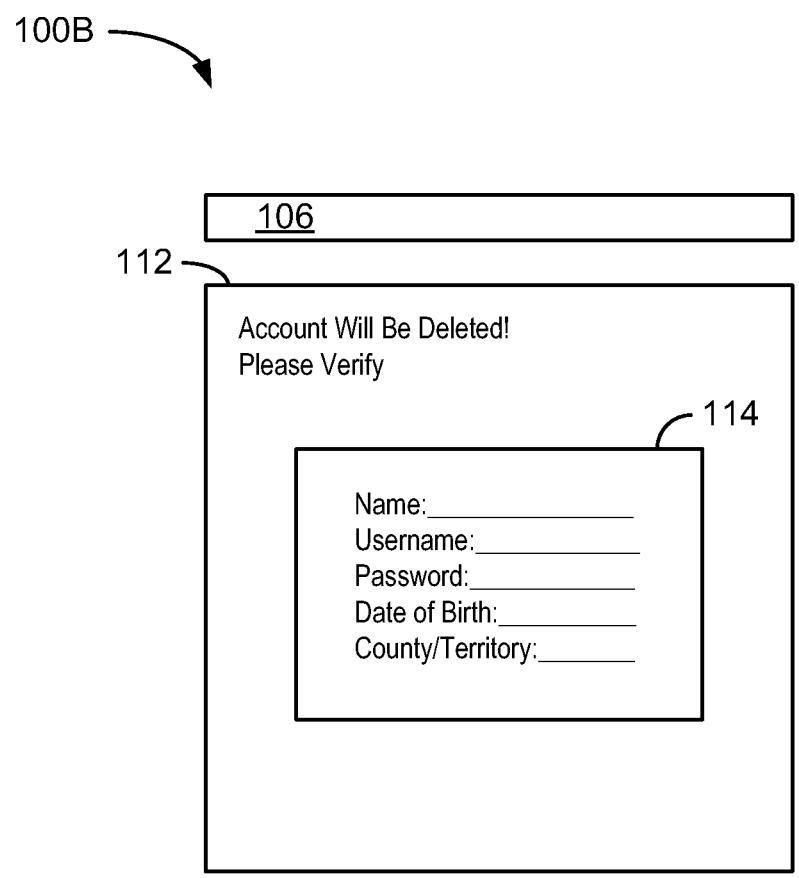

FIG. 1B is a block diagram of the interface 100B in accordance with the claimed subject matter. The interface 100B may include the toolbar 106 and the message 112. While the email may appear to be from the associate, the email may instead be spam. As shown, the message 112 may be a phishing email, requesting personal information 114 from the user. Because of their communication history, the user may suspect the message was not sent by the contact. Accordingly, the user may flag the account, using a compromised account reporting interface, as shown in interface 100C.

Figure 1C:
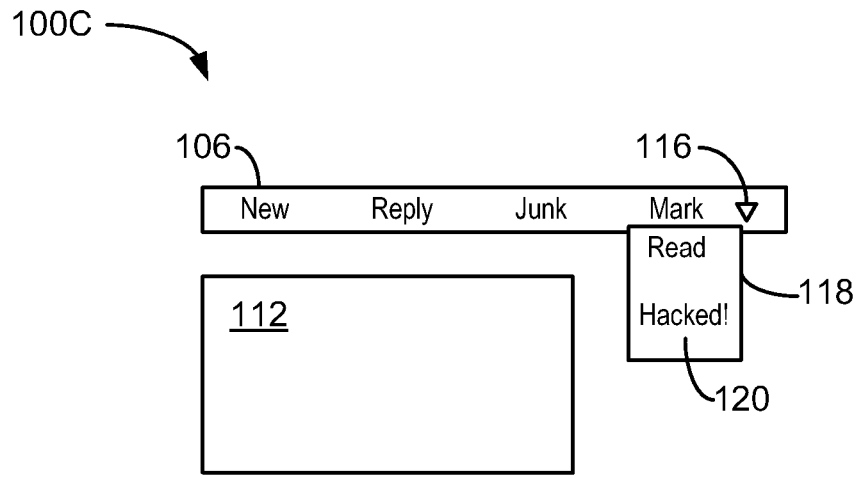

FIG. 1C is a block diagram of an interface 100C in accordance with the claimed subject matter. The interface 100C may include the toolbar 106 and the message 112. The toolbar 106 may include, next to the "MARK," a list arrow 116, which the user may select to view a list 118 of options to "MARK." The user may mark the contact's account as compromised by selecting the "HACKED!" option 120. In response, the message 112 may be moved to a junk folder.

Alternatively, the user may select the "JUNK" option from the toolbar 106. The "JUNK" option may also move the email to the junk folder. In response, the user may be presented with an alternative compromised account reporting interface, shown in interface 100D. The interface 100D may enable the user to mark the contact's account as compromised. Some users may be reluctant to label emails as spam because the user's email service may stop delivering emails from the email address. Advantageously, the interface 100D may enable the user to simultaneously report the account as compromised, and select an option to enable the sender to continue sending emails to the user.

Figure 1D:
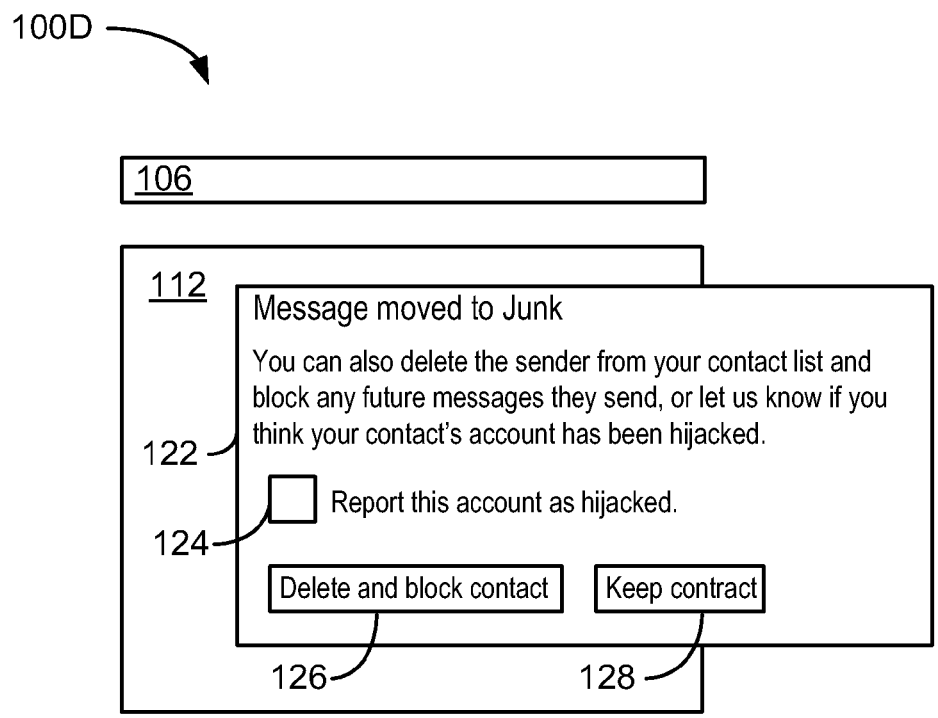

FIG. 1D is a block diagram of the interface 100D in accordance with the claimed subject matter. The interface 100D may include the toolbar 106, the message 112, and a dialog box 122. In addition to reporting the email as junk mail, the dialog box 122 may present the user with several options. Using selection box 124, the user may identify the email account of the sender as compromised. By selecting button 126, the user may block future messages from the sender, and delete the sender from a list of trusted associates, e.g., a contact list. By selecting button 128, the user may maintain the sender on the contact list while also reporting the sender's account as compromised. In one embodiment, the user may specify that messages from this sender will not be delivered until the sender's account is recovered or cleaned. Alternatively, the service may move communications from this sender to a specified folder until the account is recovered or cleaned.

In some cases, the user may be restricted to flagging associates' accounts as compromised. Additionally, the user may be enabled to flag an account when there is an existing communication relationship with the sender. An existing communication relationship may include at least one email read from the sender, and one email sent by the user to the sender.

The flagging may also be restricted to scenarios where there is only one other user involved in the communication. In an email, flagging may be restricted based on the contents of the To: or Cc: fields.

Further, the interface elements for flagging compromised accounts may not be enabled in the interface 100A. As it may be challenging for the user to determine an account is compromised without actually reading the message, the user may be restricted to reporting accounts as compromised only after having viewed the suspected email. This may protect the integrity of the user input to the complex algorithms that detect compromised accounts. Additionally, allowing the user to simultaneously flag multiple accounts as compromised may create collision scenarios.

Figure 2:
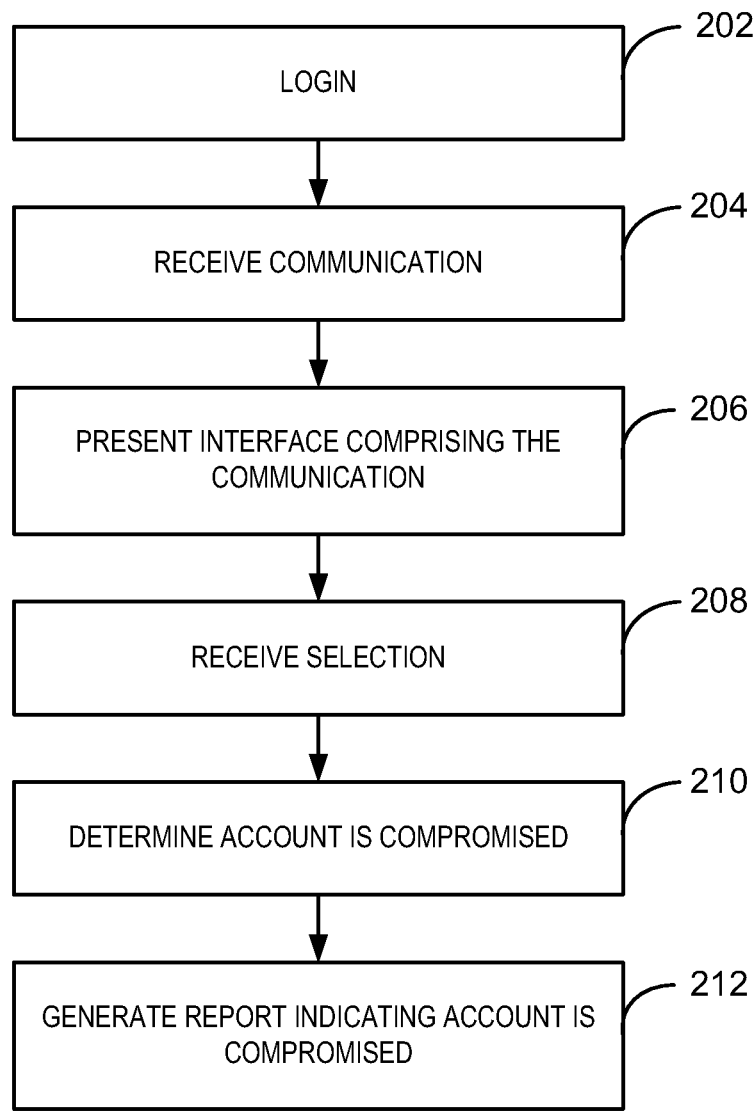
FIG. 2 is a process flow diagram of a method for detecting compromised accounts in accordance with the claimed subject matter.

FIG. 2 is a process flow diagram of a method 200 for detecting compromised accounts in accordance with the claimed subject matter. The method 200 may be performed by a service provider for a recipient of various communications. The method 200 begins at block 202, where the recipient a communication may log in to the service, e.g., an email service. As stated previously, various forms of communication may be used in various embodiments. Accordingly, various communication services may also be used. At block 204, the service provider may receive the communication from the sender's account.

At block 206, the service provider may present an interface comprising the communication to the recipient. An interface enabling the user to flag the account as compromised may be presented based on specific conditions. The conditions may include the sender being a trusted associated of the recipient, e.g., a contact. Another condition may be that the recipient and the sender have an established communication history. The history may indicate a baseline level of trust between the recipient and the sender. Such a history may include at least one previous communication from the sender. The history may indicate that the recipient read the communication. The history may also include at least one sent communication from the recipient to the sender. The recipient may read, or otherwise process, the communication. For example, users read emails. Servers or processors may also read emails and other types of communications. The recipient may determine that the communication is from a compromised source. This compromised source may be a service account that the sender uses to send communications. Accordingly, the user may make a selection indicating the account is compromised.

At block 208, the service provider may receive the selection by the recipient. At block 210, the service provider may determine that the account is compromised. This determination may be based on the user's selection. Additionally, this determination may be further based on characteristics of the sender, such as the sender's behavior regarding use of the sender's service. At block 212, the service provider may generate a report indicating the account is compromised. The report may be provided to the service provider of the compromised account, who may take remedial action.

Figure 3:
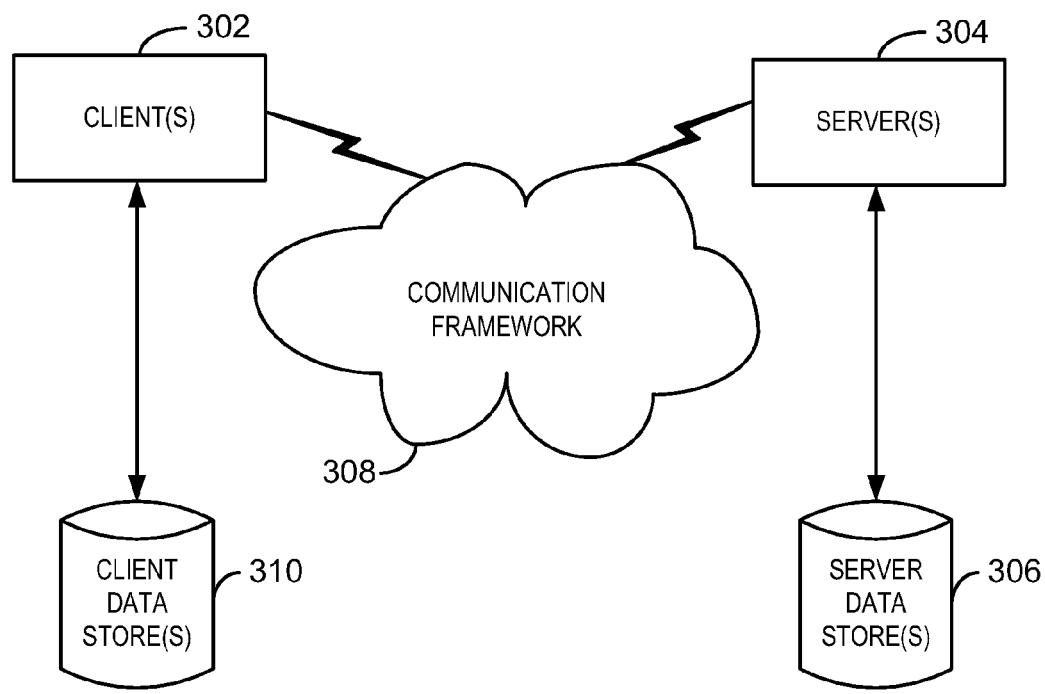
FIG. 3 is a block diagram of an exemplary networking environment wherein aspects of the claimed subject matter can be employed.

FIG. 3 is a block diagram of an exemplary networking environment 300 wherein aspects of the claimed subject matter can be employed. Moreover, the exemplary networking environment 300 may be used to implement a system and method that allows the reporting of compromised accounts, as described herein.

The networking environment 300 includes one or more client(s) 302. The client(s) 302 can be hardware and/or software (e.g., threads, processes, computing devices). As an example, the client(s) 302 may be computers providing access to servers over a communication framework 308, such as the Internet.

The environment 300 also includes one or more server(s) 304. The server(s) 304 can be hardware and/or software (e.g., threads, processes, computing devices). The server(s) 304 may include network storage systems. The server(s) may be accessed by the client(s) 302.

One possible communication between a client 302 and a server 304 can be in the form of a data packet adapted to be transmitted between two or more computer processes. The environment 300 includes a communication framework 308 that can be employed to facilitate communications between the client(s) 302 and the server(s) 304.

The client(s) 302 are operably connected to one or more client data store(s) 310 that can be employed to store information local to the client(s) 302. The client data store(s) 310 may be located in the client(s) 302, or remotely, such as in a cloud server. Similarly, the server(s) 304 are operably connected to one or more server data store(s) 306 that can be employed to store information local to the servers 304.

Figure 4:
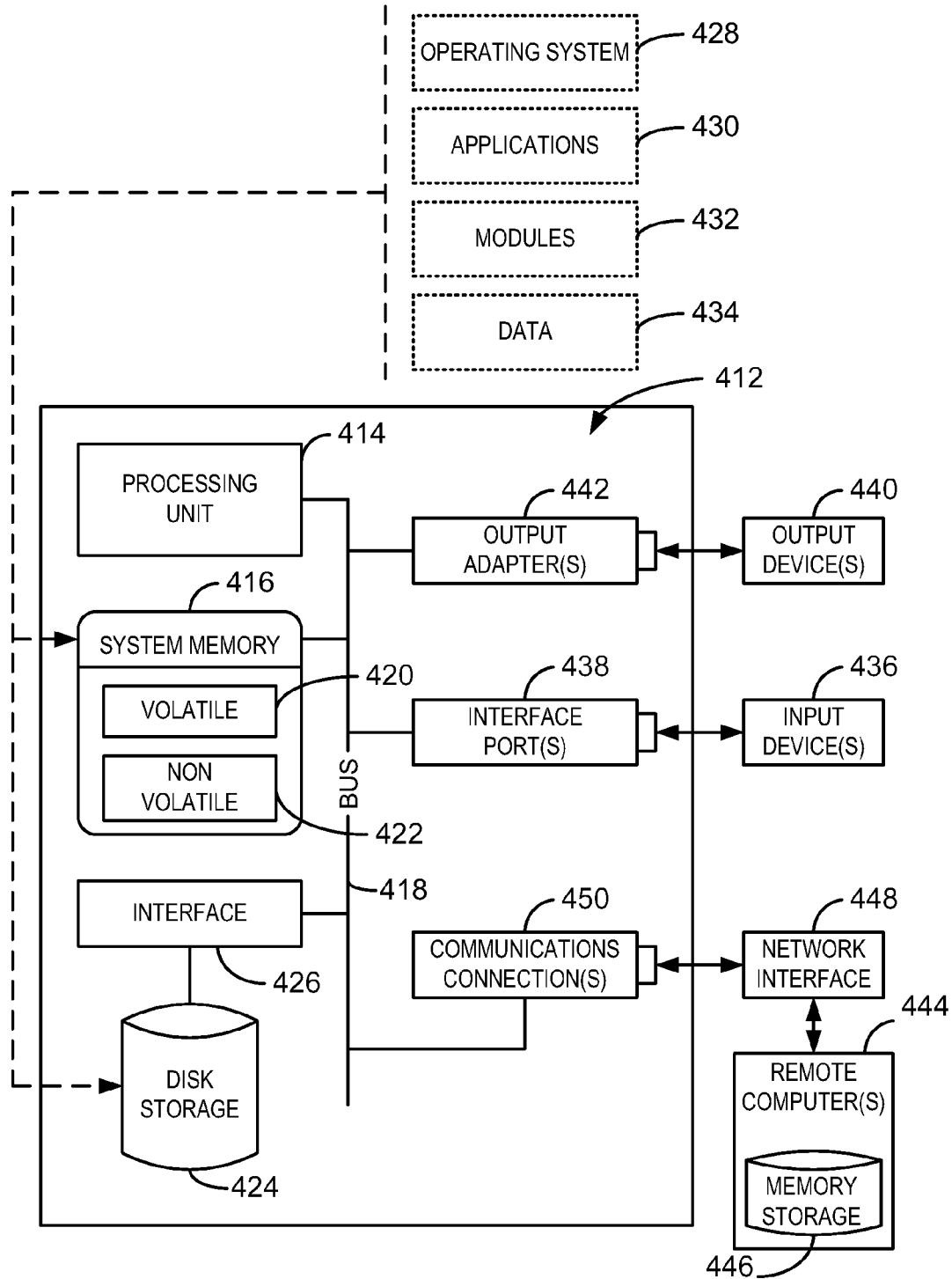
FIG. 4 is a block diagram of an exemplary operating environment for implementing various aspects of the claimed subject matter.

With reference to FIG. 4, an exemplary operating environment 400 is shown for implementing various aspects of the claimed subject matter. The exemplary operating environment 400 includes a computer 412. The computer 412 includes a processing unit 414, a system memory 416, and a system bus 418. In the context of the claimed subject matter, the computer 412 may be configured to receive emails, and may be further configured to allow a user to report accounts from which suspected malicious communications are received as compromised.

The system bus 418 couples system components including, but not limited to, the system memory 416 to the processing unit 414. The processing unit 414 can be any of various available processors. Dual microprocessors and other multiprocessor architectures also can be employed as the processing unit 414.

The system bus 418 can be any of several types of bus structure(s) including the memory bus or memory controller, a peripheral bus or external bus, and/or a local bus using any variety of available bus architectures known to those of ordinary skill in the art. The system memory 416 comprises non-transitory computer-readable storage media that includes volatile memory 420 and nonvolatile memory 422.

The basic input/output system (BIOS), containing the basic routines to transfer information between elements within the computer 412, such as during start-up, is stored in nonvolatile memory 422. By way of illustration, and not limitation, nonvolatile memory 422 can include read only memory (ROM), programmable ROM (PROM), electrically programmable ROM (EPROM), electrically erasable programmable ROM (EEPROM), or flash memory.

Volatile memory 420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 412 also includes other non-transitory computer-readable media, such as removable/non-removable, volatile/non-volatile computer storage media. FIG. 4 shows, for example a disk storage 424. Disk storage 424 includes, but is not limited to, devices like a magnetic disk drive, floppy disk drive, tape drive, Jaz drive, Zip drive, LS-100 drive, flash memory card, or memory stick.

In addition, disk storage 424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 424 to the system bus 418, a removable or non-removable interface is typically used such as interface 426.

It is to be appreciated that FIG. 4 describes software that acts as an intermediary between users and the basic computer resources described in the suitable operating environment 400. Such software includes an operating system 428. Operating system 428, which can be stored on disk storage 424, acts to control and allocate resources of the computer system 412.

System applications 430 take advantage of the management of resources by operating system 428 through program modules 432 and program data 434 stored either in system memory 416 or on disk storage 424. It is to be appreciated that the claimed subject matter can be implemented with various operating systems or combinations of operating systems.

A user enters commands or information into the computer 412 through input device(s) 436. Input devices 436 include, but are not limited to, a pointing device (such as a mouse, trackball, stylus, or the like), a keyboard, a microphone, a joystick, a satellite dish, a scanner, a TV tuner card, a digital camera, a digital video camera, a web camera, and/or the like. The input devices 436 connect to the processing unit 414 through the system bus 418 via interface port(s) 438. Interface port(s) 438 include, for example, a serial port, a parallel port, a game port, and a universal serial bus (USB).

Output device(s) 440 use some of the same type of ports as input device(s) 436. Thus, for example, a USB port may be used to provide input to the computer 412, and to output information from computer 412 to an output device 440. Output adapter 442 is provided to illustrate that there are some output devices 440 like monitors, speakers, and printers, among other output devices 440, which are accessible via adapters. The output adapters 442 include, by way of illustration and not limitation, video and sound cards that provide a means of connection between the output device 440 and the system bus 418. It can be noted that other devices and/or systems of devices provide both input and output capabilities such as remote computer(s) 444.

The computer 412 can be a server hosting various software applications in a networked environment using logical connections to one or more remote computers, such as remote computer(s) 444. The remote computer(s) 444 may be client systems configured with web browsers, PC applications, mobile phone applications, and the like.

The remote computer(s) 444 can be a personal computer, a server, a router, a network PC, a workstation, a microprocessor based appliance, a mobile phone, a peer device or other common network node and the like, and typically includes many or all of the elements described relative to the computer 412.

For purposes of brevity, only a memory storage device 446 is illustrated with remote computer(s) 444. Remote computer(s) 444 is logically connected to the computer 412 through a network interface 448 and then physically connected via a communication connection 450.

Network interface 448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 450 refers to the hardware/software employed to connect the network interface 448 to the bus 418. While communication connection 450 is shown for illustrative clarity inside computer 412, it can also be external to the computer 412. The hardware/software for connection to the network interface 448 may include, for exemplary purposes only, internal and external technologies such as, mobile phone switches, modems including regular telephone grade modems, cable modems and DSL modems, ISDN adapters, and Ethernet cards.

An exemplary processing unit 414 for the server may be a computing cluster comprising Intel® Xeon CPUs. The disk storage 424 may comprise an enterprise data storage system, for example, holding thousands of impressions.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and/or events of the various methods of the claimed subject matter.

There are multiple ways of implementing the subject innovation, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the subject innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for detecting compromised accounts, comprising:
   presenting a compromised account reporting interface comprising a selection indicating a sender's account is compromised based on specific conditions, and in response to a communication from the sender's account, wherein the selection is disabled until after the communication is read;
   determining that the sender's account is compromised based on the selection;
   generating a report indicating that the account is compromised in response to the determination; and
   blocking future communications from the sender's account to the recipient in response to the determination.

2. The method recited in claim 1, wherein determining that the account is compromised is further based on one of:
   a behavior of the sender's account;
   a reputation of the sender's account;
   a behavior of the recipient;
   a reputation of the recipient; and
   combinations thereof.

3. The method recited in claim 1, wherein the specific conditions comprise one of:
   the recipient having an established communication relationship with the sender's account; and the recipient designating the sender's account as a trusted associate.

4. The method recited in claim 3, wherein the specific conditions comprise the recipient moving the communication to a junk email folder.

5. The method recited in claim 3, wherein the established communication relationship comprises the recipient:
   receiving at least one previous communication from the sender's account;
   reading the previous communication; and
   sending at least one other communication to the sender's account.

6. The method recited in claim 1, wherein the communication comprises one of:
   an email;
   a short message service (SMS) text;
   a telephone communication;
   an image;
   a video;
   an instant message;
   a blog posting;
   a comment on the blog posting;
   an update to an online profile; and a network communication.

7. The method recited in claim 1, wherein blocking future communications comprises moving communications from the sender's account to a specified folder until the sender's account is recovered.

8. The method recited in claim 1, wherein blocking future communications comprises blocking future communications until the sender's account is recovered.

9. The method recited in claim 1, comprising allowing, in response to a subsequent selection, future communication from the sender's account to the recipient.

10. The method of claim 1, wherein the selection is disabled if there are more than two users involved in the communication.

11. A system for detecting compromised accounts, comprising:
    a processing unit; and
    a system memory, wherein the system memory comprises code configured to direct the processing unit to:
    present a reporting interface comprising a selection indicating a sender's account is compromised based on specific conditions relating to the sender's account or the communication, and in response to receiving a communication from the sender's account, wherein the selection is disabled until after the communication is read;
    determine that the sender's account is compromised based on the selection;
    generate a report, based on the determination, the report indicating the account is compromised; and
    block future communications from the sender's account to the recipient.

12. The system recited in claim 11, wherein the determination that the account is compromised is further based on one of:
    a behavior of the sender's account;
    a reputation of the sender's account; and
    combinations thereof.

13. The system recited in claim 11, wherein the specific conditions comprise one of:
    the recipient having an established communication relationship with the sender's account; and
    the recipient designating the sender's account as a trusted associate.

14. The system recited in claim 13, wherein the specific conditions comprise moving the communication to a junk email folder.

15. One or more computer-readable storage devices, comprising code configured to direct a processing unit to:
    present a compromised account reporting interface comprising a selection indicating a sender's account is compromised based on specific conditions, and in response to a communication from the sender's account to the recipient, wherein the selection is disabled until after the communication is read, and wherein the specific conditions comprise the recipient moving the communication to a junk email folder;
    determine that the sender's account is compromised based on the selection and a behavior of the sender's account;

generate a report based on the determination, the report indicating the account is compromised, wherein the report is based on the communication; and block future communications from the sender's account to the recipient in response to a subsequent selection.

16. The one or more computer-readable storage devices recited in claim 15, wherein the specific conditions comprise one of:

the recipient having an established communication relationship with the sender's account; and the recipient designating the sender's account as a trusted associate.

17. The one or more computer-readable storage devices recited in claim 16, wherein the established communication relationship comprises the recipient having:

received at least one previous communication from the sender's account;

read the previous communication; and sent at least one other communication to the sender's account.

18. The computer-readable storage devices recited in claim 15, comprising code configured to direct the processing unit to allow, in response to a subsequent selection by the recipient, future communication from the sender's account to the recipient.

19. The one or more computer-readable storage devices recited in claim 15, wherein the communication comprises an instant message, an SMS message, a telephone communication, an image, a video, a blog posting, or a comment on the blog posting.

* * * * *